Feb. 25, 1936.                M. JANNIN                 2,031,712
              MULTIPLE GROOVE EXPANDING PULLEY
                  Filed Nov. 16, 1933      2 Sheets-Sheet 1
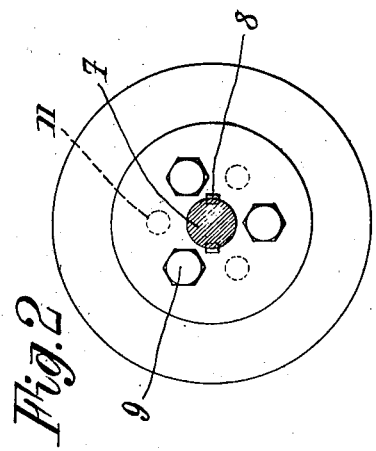
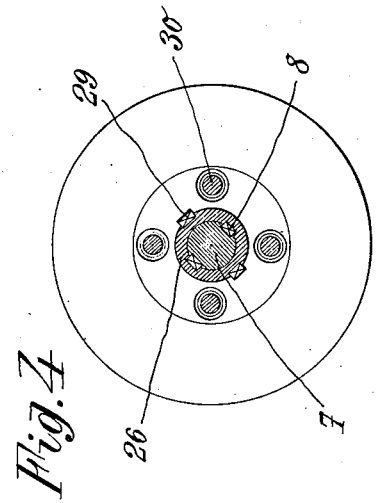
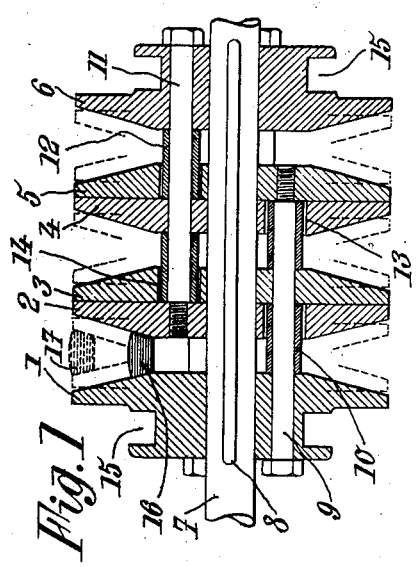
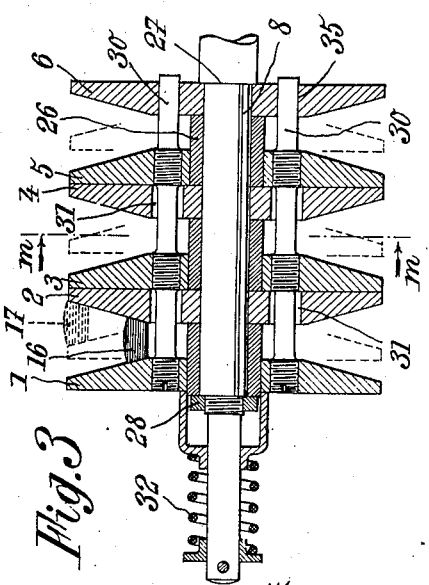
Marcel Jannin
INVENTOR
Mock & Blum
ATTORNEYS Feb. 25, 1936. M. JANNIN 2,031,712
MULTIPLE GROOVE EXPANDING PULLEY
Filed Nov. 16, 1933 2 Sheets-Sheet 2
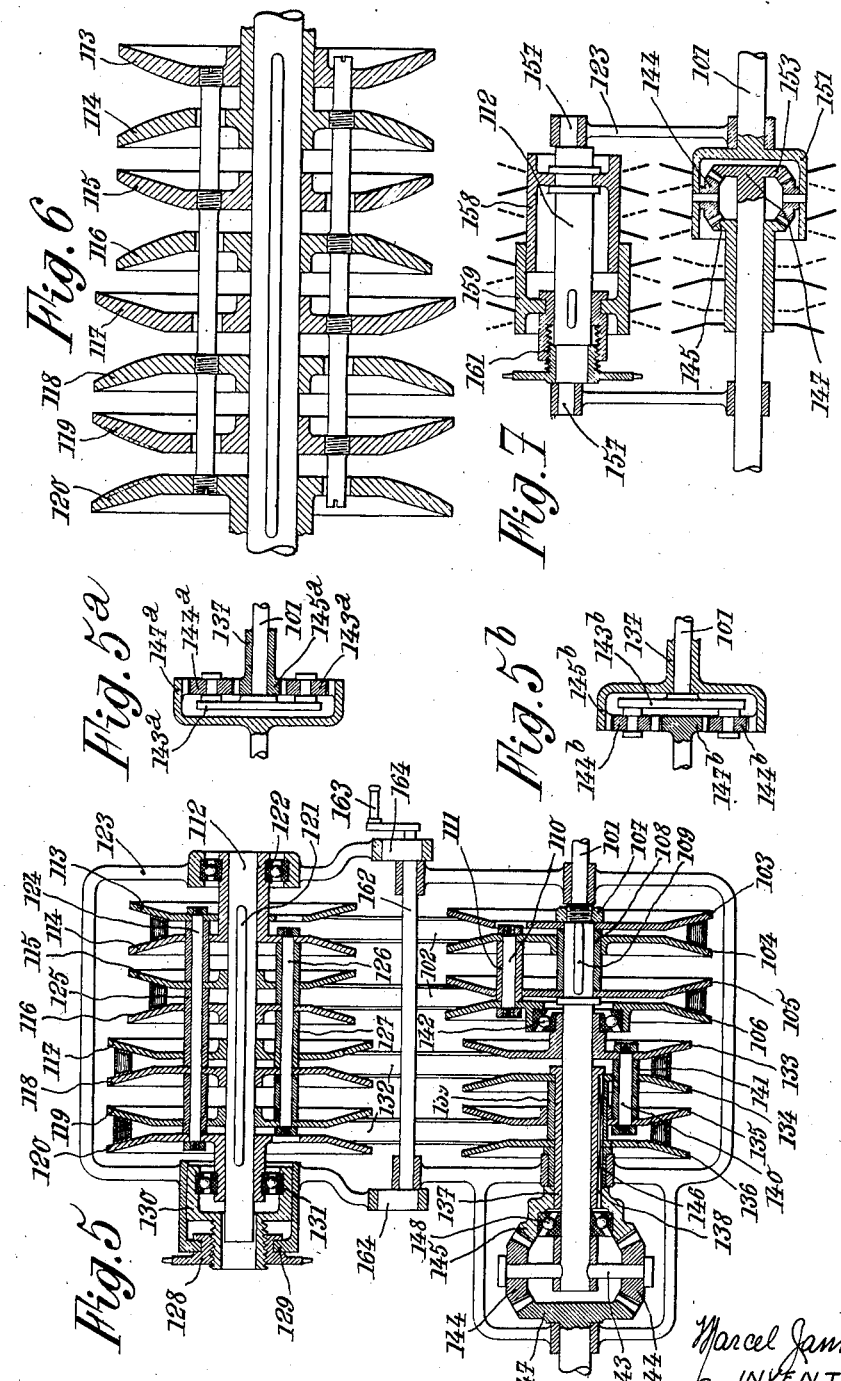
Marcel Jannin
INVENTOR
BY Mock & Blum
ATTORNEYS Patented Feb. 25, 1936

2,031,712

UNITED STATES PATENT OFFICE 2,031,712

MULTIPLE GROOVE EXPANDING PULLEY

Marcel Jannin, Meudon, France

Application November 16, 1933, Serial No. 698,330
In France December 12, 1932

18 Claims. (Cl. 74—230.17)

The present invention relates to multiple groove expanding pulleys in which the radius of the circumference around which the belt is applied on the pulley can be varied while the pulley is running.

Up to the present time, it was known to make expanding pulleys consisting of two flanges with a groove between said flanges so that only one belt could be utilized with such pulleys and the power transmitted was necessarily rather low. The object of the present invention is to provide an expanding pulley having a plurality of grooves each capable of receiving a belt which is both efficient and reliable.

Another object of my invention is to provide a change speed gear of the expanding pulley type in which the speed ratio of the driving shaft and of the driven shaft can be varied gradually.

Still another object of my invention is to provide an expanding pulley change speed gear making use of belts of trapezoidal section which makes it possible to obtain a considerable range of speeds with relatively narrow belts, the diameter of the circumference along which the belt is applied against the expanding pulleys being constantly kept relatively large.

Preferred embodiments of my invention will be hereinafter described, with reference to the accompanying drawings, given merely by way of example, and in which:

Fig. 1 is a longitudinal sectional view of a multiple expanding pulley according to my invention;

Fig. 2 is a corresponding end view;

Fig. 3 is a view similar to Fig. 1 but corresponding to another embodiment of the pulley according to my invention;

Fig. 4 is a cross sectional view corresponding to Fig. 3;

Fig. 5 is a longitudinal sectional view of a change speed gear according to my invention;

Figs. 5a and 5b are detail views of modifications;

Fig. 6 is a detail view on an enlarged scale of another modification;

Fig. 7 is a diagrammatical sectional view of another embodiment of the change speed device according to my invention.

In the embodiment of my invention shown in Figs. 1 and 2, the pulley is mounted on shaft 7 provided with a feather key 8. Flanges 1, 2, 3, 4, 5, and 6 form the elements of the expanding pulley which, in the example illustrated, comprises three grooves for the belts. These flanges are suitably bored so as to fit on shaft 7 and they are each provided with a key-way adapted to cooperate with the feather key above referred to. The working faces of the flanges are conical over the portion thereof that is to be in contact with the belts. Flanges 1, 3, and 5 are maintained at a fixed distance from one another by means of screws 9 and struts 10. These elements 9 and 10 extend throughout flanges 2, 4, and 6, which are provided with holes 13 for this purpose. In a likewise manner, flanges 2, 4, and 6 are connected together by means of screws 11 and struts 12 extending through holes 14 provided in flanges 1, 3, and 5. The end flanges 1 and 6 are each provided with a groove 15.

The operation of the pulley that has just been described is as follows: Controlling organs adapted to cooperate with grooves 15 maintain these two flanges 1 and 6 in the position shown in Fig. 1. All the flanges are caused to rotate with the shaft through the action of key 8. The belts, only one of which is shown, at 16, in Fig. 1, have their lateral faces applied against the conical faces of the flanges. In order to increase the diameter of the circumference along which the belt is working, it suffices to move flanges 1 and 6 toward each other by acting on grooves 15. As flange 2 is rigidly connected to flange 6, flanges 1 and 2 will be moved toward each other, thus compelling the belt to move away from the axis of the shaft, due to the conical shape of the faces of said flanges. The same thing will happen to the belts located between flanges 3 and 4 on the one hand and between flanges 5 and 6 on the other hand. The position shown in solid lines in Fig. 1 corresponds to the minimum diameter of the circumference around which the belt passes. The position of the flanges for the maximum diameter is shown in dotted lines, one of the three belts being shown at 17. With the arrangement shown in Figs. 1 and 2, there must also be provided means for suitably tensioning the belts irrespectively of the diameters of the circumferences around which they pass on the pulleys.

In the embodiment shown in Fig. 3, corresponding elements are designated by the same reference numbers as in the preceding example. Flanges 2, 4, and 6 are keyed on shaft 7 by means of keys 8. Said flanges are kept at the required distance from one another by struts 26 consisting of sleeves coaxially surrounding the shaft, the whole of these three flanges being applied against a shoulder 27 of the shaft by a nut 28. The other flanges 1, 3, and 5 are slidably connected with sleeves 26 through feather keys 29. These three flanges 1, 3, and 5 are maintained at the required distance from one another by threaded rods 30 screwed in these three last mentioned flanges and extending through holes 31 provided in flanges 2, 4, and 6. Flange 1 is subjected to the action of a spring 32 which tends to push it toward flange 2.

The operation of this embodiment is as follows: The three belts, only one of which is shown at 16, are pressed laterally between flanges 1 and 2, 3 and 4, 5 and 6 respectively, owing to the action of spring 32. It results therefrom that the belts adhere to the flanges, thus permitting transmission of efforts. If the tensioning of the belts is reduced, through any suitable means, the flanges move toward one another under the action of spring 32 and the belts are moved away from the axis of the shaft; but they are still compressed between the flanges by the action of spring 32. When the action of the spring and the tensioning of the belts balance each other, the diameter of the circumferences along which the belts are passing ceases to vary. Accordingly, in this embodiment of my invention, the position of the flanges depends on the tensioning of the belts and varies automatically in accordance therewith without requiring any direct action on said flanges.

With the arangement of Fig. 3, feather keys 29 can be dispensed with, the rotary movement of flanges 1, 3, and 5 being obtained through screws 30 which are slidably mounted at 35 in flange 6.

I will now proceed to describe the change speed gear of Fig. 5: The driving shaft 101 drives an expanding pulley of a type similar to those above described, which is adapted to cooperate with two belts 102 of trapezoidal cross section. This pulley comprises four flanges 103, 104, 105, and 106 having conical faces. Flanges 103 and 105 are applied against a shoulder of shaft 101 by a nut 107 and a strut 108. They are driven angularly through a key 109. Flanges 104 and 106, which are free to move axially, are connected together through rods 110 the ends of which are threaded and provided with nuts, said rods being surrounded by struts 111, so as to keep the required distance between flanges 104 and 106. There are several groups of rods 110 and struts 111 distributed around the shaft, but only one of them has been shown in the drawings. Flanges 105 and 106 are provided with holes through which pass rods 110 and struts 111, which also serve to transmit the rotary movement of flanges 103 and 105 to flanges 104 and 106.

Belts 102 pass around another expanding pulley mounted on a parallel lay-shaft 112. The last mentioned pulley comprises four conical flanges 113, 114, 115, and 116. On the same lay shaft there is provided another expanding pulley comprising four flanges 117, 118, 119, 120. These eight flanges are angularly connected to shaft 112 by key 121. Flange 114 is kept in a fixed axial position by a thrust bearing 122 mounted in frame 123. Flanges 116, 117, and 119 are connected to flange 114 through rods 126 carrying struts 127 interposed between said flanges and the ends of which are threaded so as to receive nuts. There are for instance three groups of said rods and struts distributed angularly about shaft 112 in planes making with one another an angle of 120°. Flanges 113, 115, 118, and 120 are connected together in the same way by means of rods 124 and struts 125. The axial position of the four last mentioned flanges is controlled through a sprocket wheel 128 turning in a bearing 129 of frame 123 and inwardly threaded. This threaded portion of the sprocket wheel engages with a threaded prolonged part of a cage 130 adapted to slide longitudinally without turning in frame 123 and which forms the outer portion of a thrust bearing 131 the inner ring of which is fixed to flange 120.

Flanges 117, 118, 119, and 120 serve to drive two belts 132 of trapezoidal cross section which cooperate with another expanding pulley, coaxially surrounding shaft 101 and comprising four flanges 133, 134, 135, and 136. Flanges 134 and 136 are mounted on a sleeve 137 adapted to turn freely about shaft 101. A key 138 causes sleeve 137 to be angularly driven by flanges 134 and 136. Said flanges 134 and 136 are kept at a given distance from one another by a strut 139, their axial position being fixed. The two sliding flanges 133 and 135 are connected by rods 140 and struts 141. Flange 106 acts on flange 133 through a thrust bearing 142.

Shaft 101 carries a spindle 143 at the ends of which are journalled the planet wheels 144 of an epicycloidal gear with bevel wheels. These planet wheels 144 mesh with two sun wheels 145 and 147. Sun wheel 145 is driven by sleeve 137 through key 138. Sun wheel 147 is mounted on the driven shaft. A thrust bearing 148 is interposed between shaft 101 and sun wheel 145. This bearing receives the thrust of flanges 134 and 136 through the medium of struts 139 and 146.

In order to make it possible to vary the tensioning of the belts, I provide a spindle 162 journalled in the lower part of the frame. This spindle is provided at either end with an eccentric disk 164 rigidly fixed thereto, or integral therewith. Each eccentric disk is journalled in a ring carried by the support 123 of shaft 112. A crank 163 makes it possible to rotate spindle 162 and therefore eccentrics 164 and thus to modify the distance between the main shaft and the lay shaft.

This apparatus works in the following manner: Shaft 101 drives angularly flanges 103, 104, 105, and 106 which transmit this movement to lay shaft 112 through belts 102. Flanges 117, 118, 119 and 120 in turn drive belts 132, which drive sleeve 37 and sun wheels 145. The planet wheel carrying spindle 143 is rigidly connected to the driving shaft 101. Therefore the speed of revolution of the driven shaft depends on the relative speeds of shaft 101 and sleeve 137.

If shaft 101 is supposed to rotate with a uniform speed of revolution, any variation in the speed of revolution of sleeve 137 modifies the speed of revolution of the driven shaft. In order to obtain a variation of the speed of revolution of sleeve 37 while the driving shaft is rotating, it suffices to turn sprocket wheel 128 which causes thrust bearing 131 to move axially in one direction or the other, according to the direction of rotation of sprocket wheel 128. If it be supposed, for instance that thrust bearing 131 is pushed toward thrust bearing 122, flanges 117 and 118, 119 and 120 on the one hand will tend to move toward one another respectively, while, on the other hand, flanges 113 and 114, 115 and 116 will tend to move away from one another respectively. It results therefrom that the tensioning of belts 132 will be increased while belts 102 will become slack. Consequently, belts 132 will move their respective flanges 133 and 134, 135 and 136 away from one another and this axial movement will be imparted, through thrust bearing 142, to flanges 106 and 104, thus forcing flange 106 against flange 105 and flange 104 against flange 103, which will absorb the slack of belts 102. After this displacement of the various parts of the device, the driving pulleys, constituted by flanges 103, 104, 105, 106, and 117, 118, 119, 120 will work with an increased diameter of the circumferences of contact of the belts with the pulleys, while, on the contrary, the driven pulleys, constituted by flanges 113, 114, 115, 116 and 133, 134, 135, 136 will work with a reduced diameter of the circumferences of contact of the belts with the pulleys. Consequently, the speed of revolution of sleeve 137 will be increased. An angular displacement of sprocket wheel 128 in the opposite direction would of course reduce the speed of revolution of sleeve 137.

When sleeve 137 turns with the same speed of revolution as driving shaft 101, the driven shaft also rotates with the same speed and in the same direction. In this particular case, the wheels of the epicycloidal gear turn as a whole without any relative displacement of said wheels with respect to one another. This is the direct drive.

If sleeve 137 turns with a speed of revolution smaller than that of the driving shaft, the driven shaft turns in the same direction as the driving shaft but with a higher speed of revolution.

If the speed of revolution of sleeve 137 is twice that of driving shaft 101, the driven shaft is stationary. In this case, not only is there no movement transmitted to said driven shaft, but it is prevented from moving. If the speed of revolution of sleeve 137 is then reduced without modifying that of the driving shaft 101, the driven shaft is started to revolve in the same direction as the driving shaft. On the contrary an increase of the speed of sleeve 137 would have started the driven shaft rotating in a direction opposite to that of the driving shaft.

Therefore, the apparatus above described can be utilized for varying the speed of revolution of the driven shaft with respect to that of the driving shaft, as a brake when the driven shaft is stationary, as a clutch, and as a reversing gear.

In the example shown in Fig. 5 each expanding pulley cooperates with two belts, but it is obvious that each pulley might be devised so as to cooperate with any number of belts, my invention being also applicable to the case of only one belt for each pulley.

The device according to my invention makes it to transmit a high power with a range of speed variation as wide as it is desired. This result is obtained by making use of two groups of expanding pulleys and an epicycloidal gear. Although this result might be obtained with a single group of expanding pulleys, the device above described has the advantage of reducing to the square root of the total ratio of speed variation, the maximum variation for each group of expanding pulleys. Thus it has been above explained that the variation of the speed of revolution of the driven shaft from zero to that corresponding to direct drive is obtained by varying the ratio of the angular velocities of driving shaft 101 and of sleeve 137 between 1 and 2, this variation being obtained through the combined action of the four expanding pulleys. As it is advantageous, for practical purposes, to obtain with the same apparatus both reverse gear and an angular velocity of the driven shaft higher than that of the driving shaft, the above ratio should be able to be varied, say, between 0.8 and 2.2. It will therefore suffice that each group of two cooperating pulleys should have a speed ratio ranging between 0.9 and 1.48. This narrow range of variation is very favorable to a good transmission of the movement since it makes it possible to utilize belts of relatively narrow width as compared to their thickness, moving on the pulleys along circumferences of relatively large diameter. It is a known fact that relatively wide belts are apt to buckle and that the fact of moving along circumferences of small diameter is a cause of rapid wear of the belts. Besides, the same results could be obtained with a still narrower range of speed ratio variation. It would suffice to utilize a differential gear of suitable gear ratio, for instance one with cylindrical wheels as shown in Fig. 5b, in which the number of teeth of planet wheel 145b is greater than that of planet wheel 147b.

On the other hand, if, as shown in Fig. 5a, the number of teeth of wheel 145a is smaller than that of planet wheel 147a, the power transmitted by the belts, in direct drive, is smaller than that received by the driven shaft.

As above explained, the variation of the ratio of the angular velocities of the driving shaft and of the driven shaft is obtained by moving flanges 113, 115, 118, and 120 along lay shaft 112 so as to reduce the working diameter of one of the pulleys mounted on said shaft and to increase the working diameter of the other pulley provided on said lay shaft. Furthermore, through the medium of the belts and of thrust bearing 142, a displacement of flanges 113, 115, 118, and 120 produces a displacement in the same direction of flanges 104, 106, 133, and 135 so that each of the belts is always maintained in a plane at right angles to the axes of the pulleys.

The tensioning of belts 102 produces a thrust on flanges 103 and 105 which tends to move shaft 101 toward the right hand side. In a likewise manner belts 132 tend to push flanges 134 and 136 toward the left hand side. These two axial thrusts are balanced through thrust bearing 148, which has the advantage that two thrusts are absorbed by the same thrust bearing, turning at a speed of revolution that is relatively low and even equal to zero in the case of direct drive.

The working faces of the flanges that go to make the pulleys are of conical shape, however in order to obtain a constant tensioning of the belts whatever be the ratio of transmission that is chosen, it may be advantageous to modify that shape either by curving them or by giving to the angle of the cone a value slightly different for some flanges.

Such an arrangement is shown in Fig. 6 in which the peripheral portions of the flanges are curved. This shape has the advantage of ensuring a constant tensioning of the belts irrespectively of the diameter of the circumferences along which they contact the flanges. Furthermore, as the trapezoidal cross section of each belt is deformed when the diameter of the circumference along which it is wound on the flange is changed, the curved shape of the peripheral portions of the flanges is so chosen that the lateral faces of the belt may always be applied flatwise against the corresponding flanges.

Furthermore, the control of the relative positions of the respective flanges may be performed on any of the expanding pulleys. It is also possible to control all the flanges in such manner that their axial movements may be symmetrical with respect to the belts, which then always remain in the same plane. Such a result might for instance be obtained by making use of the type of expanding pulley shown in Fig. 1.

Of course, the two pulleys mounted on lay shaft 112 might be of the type shown in Figs. 3 and 4. They may be of the type shown in Fig. 6, in which flanges 113, 115, 118, and 120 are connected together by a rod screwing in said flanges and extending freely through holes provided in the other flanges 114, 116, 117, 119, while flanges 114, 116, 117, 119 are connected together by rods screwing in the last mentioned flanges and extending freely through holes provided in the other flanges 113, 115, 118, and 120.

The control of the speed ratio variation may be performed either automatically or manually.

Fig. 7 is a diagrammatical view of another embodiment of the change speed gear according to my invention. In this figure I have shown in solid lines the flanges that are fixed in the axial direction and in dotted lines the flanges that may slide in said axial direction. The driving shaft 101 drives a pulley 151 which is hollow and carries planet wheels 144 journalled therein and meshing with sun wheels 145 and 147 of the epicycloidal gear. The lay shaft 112 is fixed in frame 123 through eccentric bearings 157. The pulleys mounted on the lay shaft consist of two drums 158 and 159 sliding with respect to each other and adapted to rotate together. Drum 158 cannot move in the axial direction and determines the axial position of the flanges shown in solid lines. The flanges shown in dotted lines are connected to drum 159 the axial position of which is controlled through a sleeve 161 slidably keyed on the lay shaft. This sleeve 161 is moved in the axial direction by sprocket wheel 128 in which it is screwed, in the same manner as above described with respect to Fig. 5.

The working of the embodiment just above described is the same as that explained with respect to the embodiment of Fig. 5. However, in this case the pulleys mounted on the lay shaft turn with respect to said shaft which is stationary and which can, through eccentrics 157, vary the tensioning of the belts, even when the device is running. Furthermore, as the epicycloidal gear and the means for controlling the axial displacements of the movable flanges are located inside the pulleys, the room occupied by the device is considerably reduced.

Apparatus of the type above described can be applied to mechanisms in which it is necessary, or desirable, to have a variable speed ratio transmission, such as machine tools, conveying apparatus, automobile vehicles, etc. The apparatus according to my invention are also applicable to the cases in which a stationary shaft must be first maintained in a fixed position and then progressively actuated in one direction or the other, with a load applied thereon as soon as it starts moving, as it is the case in particular for automotive vehicles, for tractors or for hoisting engines. The apparatus according to my invention are also adapted to the control of a shaft or other organ the motion of which is proportional to that of the operating apparatus such as a rudder or the turret of a warship.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:—

1. An expanding pulley adapted to be mounted on a shaft, which comprises in combination, a series of flanges mounted in juxtaposition on said shaft so as to form a plurality of pairs each adapted to accommodate a belt between its flanges the respective faces of the two flanges of a pair that are in contact with the belt being inclined so as to cause the belt to move radially with respect to the shaft when two flanges are given a relative axial displacement, a plurality of rods extending throughout said flanges, means on said rods for removably fixing in a rigid manner the even numbered flanges of said series relatively to one another in the axial direction while allowing said even numbered flanges to move with respect to the odd numbered flanges, means wholly independent, for relative displacements in the axial direction, of the last mentioned means for removably connecting together in a rigid manner all the odd numbered flanges of said series, means for angularly connecting said flanges to said shaft, and means for producing relative axial displacements of the whole of the even numbered flanges and of the whole of the odd numbered flanges.

2. An expanding pulley adapted to be mounted on a shaft, which comprises in combination, a series of flanges mounted in juxtaposition on said shaft so as to form a plurality of pairs each adapted to accommodate a belt between its flanges, the respective faces of the two flanges of a pair that are to be in contact with the belt being inclined so as to cause the belt to move radially with respect to the shaft when said two flanges are given a relative axial displacement, a plurality of rods parallel to said shaft extending through said flanges, a plurality of tubular struts surrounding said rods and each interposed between two consecutive even numbered flanges and adapted to slide freely, in the axial direction, with respect to the odd numbered flanges, means for detachably forcing the second flange of the series toward the last flange of said series, a plurality of rods parallel to said shaft extending through said flanges, a plurality of tubular struts surrounding the last mentioned rods and interposed between two consecutive odd numbered flanges of the series, means for detachably forcing the first flange of the series toward the last odd numbered flange of the series, and means for slidably keying said flanges on said shaft.

3. An expanding pulley adapted to be mounted on a shaft, which comprises in combination, a series of flanges mounted in juxtaposition on said shaft so as to form a plurality of pairs each adapted to accommodate a belt between its flanges, the respective faces of the two flanges of a pair that are to be in contact with the belt being inclined so as to cause the belt to move radially with respect to the shaft when said two flanges are given a relative axial displacement, a plurality of rods screwed in all of the odd numbered flanges of the series, the even numbered flanges being provided with holes through which said rods can slide freely, means for rigidly connecting together all the even numbered flanges of the series, means for angularly connecting said flanges to said shaft, and elastic means for urging the odd numbered flanges against the even numbered flanges respectively.

4. An expanding pulley according to claim 3 in which the means for rigidly connecting together all the even numbered flanges comprise a series of tubular struts coaxially mounted on said shaft each between two consecutive even numbered flanges, the odd numbered flanges being coaxially mounted on said tubular struts, the means for angularly connecting said flanges to said shaft comprising keying means interposed between said shaft, on the one hand, and said tubular struts and even numbered flanges, on the other hand.

5. An expanding pulley according to claim 3 in which the means for rigidly connecting together all the even numbered flanges comprise a series of tubular struts coaxially mounted on said shaft each between two consecutive odd numbered flanges, the odd numbered flanges being coaxially mounted on said tubular struts, the means for angularly connecting said flanges to said shaft comprising keying means interposed between, said shaft, on the one hand, and said tubular struts and even numbered flanges, on the other hand, and keying means interposed between said tubular struts and said odd numbered flanges.

6. An expanding pulley according to claim 3 in which the even numbered flanges are fixed in the axial direction with respect to said shaft and the elastic means are interposed between said shaft and said odd numbered flanges.

7. An expanding pulley according to claim 1 in which the means for rigidly fixing the even numbered flanges relatively to one another in the axial direction consist of screen threads provided on said rods and screwed in said even numbered flanges, the odd numbered flanges being provided with holes through which said rods can slide freely, and the means for rigidly connecting together the odd numbered flanges consist of a plurality of rods screwed in all of said odd numbered flanges, the even numbered flanges being provided with holes through which the last mentioned rods can slide freely.

8. In combination with an expanding pulley including a shaft and two flanges angularly fixed on said shaft and adapted to move relatively to each other in the axial direction of said shaft, the respective inner faces of these two flanges being inclined toward the intermediate part of the shaft so as to cause a belt inserted between said flanges to move radially with respect to said shaft when said two flanges are given a relative axial displacement, a device for controlling these relative axial displacements which comprises in combination, a support fixed in the axial direction with respect to one of said flanges, two members screwing in each other about the axis of said shaft, one of said members being journalled in said support coaxially with said shaft, the other being slidably keyed in said support parallelly to said shaft, means for controlling the angular displacements of the first mentioned member and means for axially connecting the second mentioned member and the other flange.

9. In combination with an expanding pulley including a shaft and two flanges angularly fixed on said shaft and adapted to move relatively to each other in the axial direction of said shaft, the respective inner faces of these two flanges being inclined toward the intermediate part of the shaft so as to cause a belt inserted between said flanges to move radially with respect to said shaft when said two flanges are given a relative axial displacement, a device for controlling these relative axial displacements of the two flanges, which comprises in combination, a frame, means for fixing one of said flanges with respect to said frame in the axial direction thereof, a sprocket wheel provided with internal threads journalled in said frame coaxially with said shaft, a tubular member screwing in said sprocket wheel coaxially with said shaft and adapted to slide in said frame parallelly to said shaft but prevented from rotating therein, a sleeve rigidly connected to the other flange, and a thrust bearing interposed between said tubular member and said sleeve.

10. In a variable speed power transmission device, the combination of three parallel shafts, two expansible pulleys keyed on the first and second shafts respectively, two expansible pulleys both keyed on the third shaft opposite said two first mentioned pulleys respectively, belts connecting together the pulleys mounted opposite each other, means for operatively connecting with each other the two first mentioned pulleys so that an increase in the working diameter of one of these two first mentioned pulleys causes a reduction of the working diameter of the other of these two first mentioned pulleys, means for operatively connecting with each other the two second mentioned pulleys so that an increase in the working diameter of one of these two second mentioned pulleys causes a reduction of the working diameter of the other of said two second mentioned pulleys, and means for controlling the working diameter of one of said second mentioned pulleys.

11. In a variable speed power transmission device, the combination of three parallel shafts, two expansible pulleys keyed on the first and second shafts respectively, two expansible pulleys both keyed on the third shaft opposite said two first mentioned pulleys respectively, at least one axially movable flange in each of these pulleys, belts connecting together the pulleys mounted opposite each other respectively, means for operatively connecting together the axially movable flanges of the two first mentioned pulleys so that a sliding displacement of one of these last mentioned flanges in the direction that increases the working diameter of its respective pulley causes a sliding displacement of the axially movable flange of the other of these first mentioned pulleys in the direction that decreases the working diameter of said last mentioned pulley, means for operatively connecting together the axially movable flanges of the two second mentioned pulleys so that a sliding displacement of one of these last mentioned flanges in the direction that increases the working diameter of its respective pulley causes a sliding displacement of the axially movable flange of the other of these two second mentioned pulleys in the direction that decreases the working diameter of said last mentioned pulley, and means for controlling the axial position of at least one of the last mentioned axially movable flanges with respect to the third shaft.

12. In a variable speed power transmission device, the combination of two shafts in line with each other, a third shaft parallel with the two first mentioned shafts, two expansible pulleys keyed on the first and second shafts respectively, two expansible pulleys both keyed on the third shaft opposite said two first mentioned pulleys respectively, at least one axially movable flange in each of these pulleys, belts connecting together the pulleys mounted opposite each other respectively, means for operatively connecting together the axially movable flanges of the two first mentioned pulleys so that a sliding displacement of one of these last mentioned flanges in the direction that increases the working diameter of its respective pulley causes a sliding displacement of the axially movable flange of the other of these two first mentioned pulleys in the direction that decreases the working diameter of said last mentioned pulley, means for operatively connecting together the axially movable flanges of the two second mentioned pulleys so that a sliding displacement of one of these last mentioned flanges in the direction that increases the working diameter of its respective pulley causes a sliding displacement of the axially movable flange of the other of these two second mentioned pulleys in the direction that decreases the working diameter of said last mentioned pulley, and means for controlling the axial position of at least one of the last mentioned axially movable flanges with respect to the third shaft.

13. A combination according to claim 12 in which the second shaft consists of a sleeve surrounding the first shaft.

14. In a variable speed power transmission device, the combination of two shafts in line with each other, a third shaft parallel to these two first mentioned shafts, two expansible pulleys keyed on the first and second shafts respectively, two expansible pulleys keyed on the third shaft opposite said two first mentioned pulleys respectively, each of these pulleys including a series of flanges mounted in juxtaposition on the corresponding shaft so as to form a plurality of pairs each adapted to accommodate a belt between its flanges, the respective faces of the two flanges of a pair that are in contact with the belt being inclined so as to cause the belt to move radially with respect to the shaft when two flanges are given a relative axial displacement, a plurality of rods extending throughout said flanges, means on said rods for rigidly fixing the even numbered flanges of said series relatively to one another in the axial direction, and means for rigidly connecting together all the odd numbered flanges of said series, belts connecting together the pairs of flanges mounted opposite each other on the third shaft and the first and second shafts respectively, means for axially connecting an even numbered flange of one of the two first mentioned pulleys with an odd numbered flange of the other of said two first mentioned pulleys, so that an increase in the working diameter of one of the two first mentioned pulleys causes a reduction of the working diameter of the other of said two first mentioned pulleys, means for rigidly connecting together the even numbered flanges of one of the two second mentioned pulleys with the odd numbered flanges of the other of said second mentioned pulleys, so that an increase in the working diameter of one of the two second mentioned pulleys causes a reduction of the working diameter of the other of these two second mentioned pulleys, and means for controlling the axial positions of the axially movable flanges of the two second mentioned pulleys with respect to said third shaft.

15. In a variable speed power transmission device, the combination of two shafts in line with each other, a third shaft parallel to these two first mentioned shafts, two expansible pulleys keyed on the first and second shafts respectively, two expansible pulleys keyed both on the third shaft opposite said two first mentioned pulleys respectively, each of these pulleys including a series of flanges mounted in juxtaposition on the corresponding shaft so as to form a plurality of pairs each adapted to accommodate a belt between its flanges, the respective faces of the two flanges of a pair that are in contact with the belt being inclined so as to cause the belt to move radially with respect to the shaft when two flanges are given a relative axial displacement, a plurality of rods extending throughout said flanges, means on said rods for rigidly fixing the even numbered flanges of said series relatively to one another in the axial direction, and means for rigidly connecting together all the odd-numbered flanges of said series, belts adapted to connect together the pairs of flanges mounted opposite one another on the third shaft and the first and second mentioned shafts respectively, a thrust ball bearing interposed between an even-numbered flange of one of the two first mentioned pulleys and an odd-numbered flange of the other of said two first mentioned pulleys, whereby an increase in the working diameter of one of said two first mentioned pulleys causes a reduction of the working diameter of the other of said two first mentioned pulleys, means for rigidly connecting together the even-numbered flanges of one of the two second mentioned pulleys with the odd-numbered flanges of the other of said second mentioned pulleys, so that an increase in the working diameter of one of the two second mentioned pulleys causes a reduction of the working diameter of the other of these two second mentioned pulleys, and means for controlling the axial positions of the axially movable flanges of the two second mentioned pulleys with respect to said third shaft.

16. A power transmitting device which compises in combination, a shaft, at least two flanges, means for moving said flanges relatively to each other in the direction of the axis of said shaft, the peripheral portions of the faces of said flanges that are turned toward each other being each in the shape of a surface of revolution approximating a portion of a cone, but with a slight curvature the convexity of which is turned toward the other flange of the pair, and a belt of trapezoidal section made of a deformable material having its inclined faces applied against said faces of the flanges.

17. An expanding pulley adapted to be mounted on a shaft, which comprises, in combination, a series of flanges mounted in juxtaposition on said shaft so as to form a plurality of pairs each adapted to accommodate a belt between its flanges, the respective faces of the two flanges of a pair that are in contact with the belt being inclined so as to cause the belt to move radially with respect to the shaft when said two flanges are given a relative axial displacement, a plurality of rods parallel to said shaft extending through said flanges, a plurality of tubular struts surrounding said rods and each interposed between two consecutive even numbered flanges, each of said rods being threaded at one end and provided with a head at the other end so as to force the second flange of the series toward the last flange of said series, a plurality of rods parallel to said shaft extending through said flanges, a plurality of tubular struts surrounding the last mentioned rods and each interposed between two consecutive odd numbered flanges of the series, each of said last mentioned rods being threaded at one end and provided with a head at the other end so as to force the first flange of the series toward the last odd numbered flange of said series, and means for slidably keying said flanges on said shaft.

18. In a variable speed power transmission device, the combination of three parallel shafts, two expansible pulleys keyed on the first and second shafts respectively, two expansible pulleys both keyed on the third shaft opposite said two first mentioned pulleys respectively, at least two flanges in each pulley axially slidable with respect to each other, belts connecting together the pulleys located opposite each other respectively, means for operatively connecting together the axially movable flanges of the two first mentioned pulleys so that a sliding displacement of one of these last mentioned flanges in the direction that increases the working diameter of its respective pulley causes a sliding displacement of the axially movable flange of the other of these two first mentioned pulleys in the direction that decreases the working diameter of said last mentioned pulley, means for axially connecting together the first flange of one of the two second mentioned pulleys to the second flange of the other of said second mentioned pulleys, means for axially connecting together the second flange of the first of said second mentioned pulleys to the first flange of the second of these two second mentioned pulleys, a frame in which said shafts are journalled, means for fixing one of the flanges of the two second mentioned pulleys on the third shaft in the axial direction thereof, a sprocket wheel provided with threads journalled in said frame coaxially with said third shaft, a tubular member screwing in said sprocket wheel coaxially with said third shaft and adapted to slide in said frame parallelly to said shaft, but prevented from rotating therein, a sleeve rigidly connected to one of the flanges of said two second mentioned pulleys that are slidable with respect to said third shaft, and a thrust bearing interposed between said tubular member and said sleeve.

MARCEL JANNIN.